(12) United States Patent
Matthews et al.

(10) Patent No.: US 7,696,953 B2
(45) Date of Patent: *Apr. 13, 2010

(54) METHODS AND SYSTEMS FOR A PORTABLE, INTERACTIVE DISPLAY DEVICE FOR USE WITH A COMPUTER

(75) Inventors: Joseph H. Matthews, Woodinville, WA (US); Richard W. Stoakley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 766 days.

This patent is subject to a terminal disclaimer.

(21) Appl. No.: 11/538,717

(22) Filed: Oct. 4, 2006

(65) Prior Publication Data

US 2007/0143517 A1    Jun. 21, 2007

Related U.S. Application Data

(63) Continuation of application No. 10/869,604, filed on Jun. 16, 2004, now Pat. No. 7,183,999, which is a continuation of application No. 09/784,716, filed on Feb. 15, 2001, now Pat. No. 6,784,855.

(51) Int. Cl.
    *G09G 5/00* (2006.01)
(52) U.S. Cl. .............................. 345/1.1; 345/2; 345/1.3; 345/173; 345/156
(58) Field of Classification Search ........... 345/1.1–1.3, 345/156, 157, 163, 168, 169, 172–174, 179, 345/505, 659, 905; 178/18.01; 363/59; 455/1, 455/63, 67.3, 517, 524; 701/33; 709/227; 713/200, 176

See application file for complete search history.

(56) References Cited

U.S. PATENT DOCUMENTS

| | | | |
|---|---|---|---|
| 5,233,502 A | | 8/1993 | Beatty et al. |
| 5,579,489 A | * | 11/1996 | Dornier et al. .............. 710/303 |
| 5,606,365 A | | 2/1997 | Maurinus et al. |
| 5,740,801 A | | 4/1998 | Branson |
| 5,794,164 A | | 8/1998 | Beckert et al. |
| 5,835,366 A | * | 11/1998 | Pleso et al. .................. 363/59 |
| 5,850,209 A | * | 12/1998 | Lemke et al. ............... 345/156 |

(Continued)

FOREIGN PATENT DOCUMENTS

| | | |
|---|---|---|
| DE | 19642267 | 5/1998 |
| DE | 19800778 | 7/1999 |
| DE | 20003469 | 8/2000 |
| DE | 19949984 | 10/2000 |
| JP | 466643 | 6/1992 |

(Continued)

*Primary Examiner*—Prabodh M Dharia
(74) *Attorney, Agent, or Firm*—Lee & Hayes, PLLC

(57) ABSTRACT

A portable, interactive display device is disclosed. The device presents to a user the graphical interface of a host computer. The host is separate from the display device and sits in a fixed location. The invention allows a user to carry with him the user interface capability of the host, limited only by the capabilities of a wireless communications channel to the host. The host provides processing, storage, and access to its own peripheral devices. The display device need only provide the amount of processing necessary to communicate with the host, to run the client side of the hosting software, and to provide security functions. The host provides a docking station that accommodates the display device. When in the docking station, the display device continues to operate but communicates with the host through the docking station rather than through the wireless channel. This allows for a higher quality video connection.

20 Claims, 6 Drawing Sheets

U.S. PATENT DOCUMENTS

| | | | |
|---|---|---|---|
| 5,867,406 A | 2/1999 | Yanagisawa | |
| 5,877,819 A | 3/1999 | Branson | |
| 5,926,364 A | 7/1999 | Karidis | |
| 5,940,771 A * | 8/1999 | Gollnick et al. | 455/517 |
| 5,950,110 A | 9/1999 | Hendrickson | |
| 6,006,243 A | 12/1999 | Karidis | |
| 6,009,363 A | 12/1999 | Beckert et al. | |
| 6,044,131 A * | 3/2000 | McEvoy et al. | 378/162 |
| 6,085,247 A | 7/2000 | Parsons, Jr. et al. | |
| 6,175,789 B1 | 1/2001 | Beckert et al. | |
| 6,189,146 B1 | 2/2001 | Misra et al. | |
| 6,202,008 B1 | 3/2001 | Beckert et al. | |
| 6,256,671 B1 | 7/2001 | Strentzsch et al. | |
| 6,314,406 B1 * | 11/2001 | O'Hagan et al. | 705/14 |
| 6,340,957 B1 | 1/2002 | Adler et al. | |
| 6,351,652 B1 * | 2/2002 | Finn et al. | 455/552.1 |
| 6,446,208 B1 * | 9/2002 | Gujar et al. | 713/185 |
| 6,665,173 B2 * | 12/2003 | Brandenberg et al. | 361/679.09 |
| 6,670,950 B1 | 12/2003 | Chin et al. | |
| 6,697,441 B1 * | 2/2004 | Bottomley et al. | 375/340 |
| 6,718,535 B1 * | 4/2004 | Underwood | 717/101 |
| 6,784,855 B2 * | 8/2004 | Matthews et al. | 345/1.1 |
| 6,864,891 B2 | 3/2005 | Myers | |
| 7,016,182 B2 * | 3/2006 | Brandenberg et al. | 361/679.06 |
| 7,054,965 B2 | 5/2006 | Bell et al. | |
| 7,073,197 B2 * | 7/2006 | Rabin et al. | 726/18 |
| 7,131,144 B2 * | 10/2006 | Rabin et al. | 726/30 |
| 7,183,999 B2 * | 2/2007 | Matthews et al. | 345/1.1 |
| 7,358,959 B2 * | 4/2008 | Fitzsimmons, Jr. | 345/169 |
| 2002/0068991 A1 * | 6/2002 | Fitzsimmons, Jr. | 700/214 |
| 2002/0109665 A1 * | 8/2002 | Matthews et al. | 345/156 |
| 2003/0063072 A1 * | 4/2003 | Brandenberg et al. | 345/173 |
| 2004/0032393 A1 * | 2/2004 | Brandenberg et al. | 345/156 |
| 2004/0128515 A1 * | 7/2004 | Rabin et al. | 713/176 |
| 2004/0133803 A1 * | 7/2004 | Rabin et al. | 713/200 |
| 2006/0082518 A1 | 4/2006 | Ram | |

FOREIGN PATENT DOCUMENTS

| | | |
|---|---|---|
| JP | 2000078232(A) | 3/2000 |
| JP | 2000163171(A) | 6/2000 |
| WO | WO9949383(A1) | 9/1999 |

* cited by examiner

METHODS AND SYSTEMS FOR A PORTABLE, INTERACTIVE DISPLAY DEVICE FOR USE WITH A COMPUTER

RELATED APPLICATIONS

This is a continuation of and claims priority to U.S. patent application Ser. No. 10/869,604 filed on Jun. 16, 2004 entitled "Methods and system for a portable, interactive display device for use with a computer" by inventors Joseph H. Matthews and Richard W. Stoakley, now U.S. Pat. No. 7,183,999, which is a continuation of and claims priority to U.S. patent application Ser. No. 09/784,716 filed on Feb. 15, 2001, now U.S. Pat. No. 6,784,855, with the same title by the same inventors.

BACKGROUND

The ever increasing usefulness of the personal computer (PC) leads users to an ever increasing dependence upon its capabilities. Ironically, that dependence in turn highlights some shortcomings of the traditional, "location-based," model of computing. In that model, users come to a powerful, self-contained PC when they have computing tasks to perform. This model has long been accepted, but clearly preferable is a "user-based" model of computing, wherein computing power comes to the user whenever, and wherever, it is needed.

The proliferation of laptop computers, pocket PCs, and their ilk illustrates a first step toward user-based computing. Users carry computing power with them so that it is always available. Useful as they are, however, portable devices have not eliminated the fixed location PC. The fixed PC offers greater levels of performance than do many portables. Also, many peripheral devices are best left in one place, whether because of their weight, such as in the case of high-quality printers and scanners, or because of their connection to inherently fixed resources, such as Internet access devices that use DSL, fiber optic, CATV, or other "tethered" communications media. Even if the functionality of these peripherals could be made portable, their power drain would exacerbate an already sore point with users of portable devices. Many users are also hard pressed to justify the expense of owning both fixed and portable versions of some devices, especially as the fixed devices stand idle while the user moves about.

Microsoft's "WINDOWS TERMINAL SERVICES" (WTS) takes another step toward user-based computing, a step beyond laptops. WTS leverages the power of a fixed location PC, making it serve as host for numerous client workstations. The workstations communicate with the host, and each workstation uses the computing power, storage, and other resources of the host to present a user with the experience of running a full PC.

Thus, the host can be placed in a location best suited for connecting to its peripherals and to tethered data channels while the workstations are placed at locations more convenient to the users. The host can be always running so that when a user accesses a workstation, he is faced only with a minimal login delay rather than a full boot delay. Because the host supports multiple, simultaneous users, a family that needs another PC may purchase a relatively inexpensive workstation rather than a second full PC. Upgrade costs are reduced as they are localized to the host whose upgraded resources are then made available for use by all users via the client workstations.

However, a PC (or PC-like workstation) in every room does not satisfy a user when his desire is for computing portability, not just computing ubiquity. Portability is especially important when the user wants to use the services of the computer while he is doing something else. For example, he may read news from an Internet service while eating breakfast or may scan sports statistics while watching television. at is needed is a device that separates the parts of the PC that have some reason for staying fixed (either by inherent necessity or by economic desirability) from the parts of the PC that the user needs to access as he wanders. An ideal device would leverage the power and connectivity of the fixed PC while allowing the flexibility of movement and location of portable devices.

SUMMARY

The above problems and shortcomings, and others, are addressed by the present invention, which can be understood by referring to the specification, drawings, and claims. The present invention is a portable, interactive display device that presents to a user the graphical user interface of a host computer. The host is separate from the display device and usually sits in a fixed location. The invention allows a user to carry with him as he roams about the full user interface capability of the host, limited only by the capabilities of a wireless communications channel to the host. Devices made according to the invention include a display screen along with any number of other user input and output peripherals such as a mouse, keyboard, pen and touch screen, speaker, camera, and the like. The host provides processing, storage, and access to its own peripheral devices.

The display device need only provide the amount of processing necessary to communicate with the host, to run the client side of the hosting software, and to provide security functions. The host provides a docking station that accommodates the display device. When in the docking station, the display device continues to operate but communicates with the host through the docking station rather than through the wireless channel. This allows for a higher quality video connection. The docking station may provide power to run the display device and to recharge its batteries.

DETAILED DESCRIPTION

Figure 1:
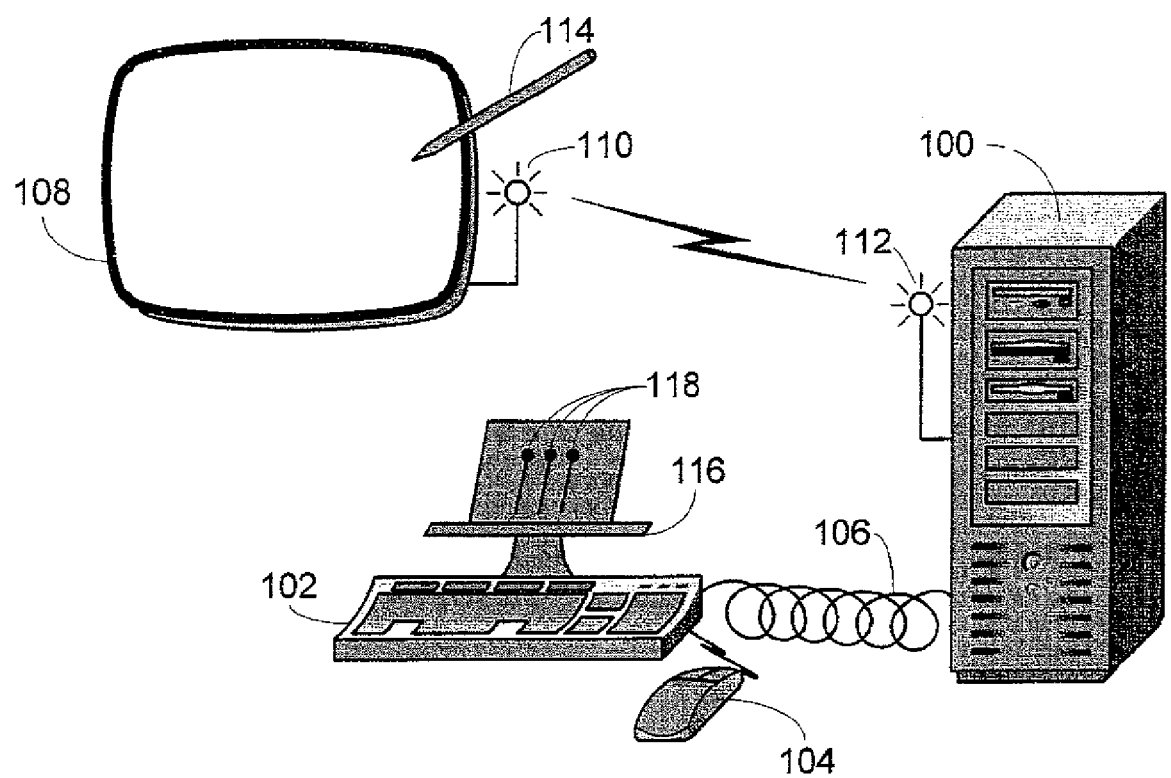
FIG. 1 is a schematic drawing of a portable, interactive display device in an exemplary environment.

Turning to the drawings, wherein like reference numerals refer to like elements, the invention is illustrated as being implemented in a suitable computing environment. The following description is based on embodiments of the invention and should not be taken as limiting the invention with regard to alternative embodiments that are not explicitly described herein.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

The Portable, Interactive Display Device

The present invention is a portable, interactive display device that presents to a user the graphical user interface of a host computing device. An overview of the invention is presented with reference to FIG. 1, while details are presented later. FIG. 1 is a schematic drawing of the portable display device in an exemplary environment. The host computing device 100 is separate from the display device 108 and usually sits in a fixed location. The host may support any number of peripherals, here illustrated by a keyboard 102 and mouse 104 attached to the host by a wired communications channel 106. The display device 108 operates in two modes: tethered and untethered. When untethered, the display device communicates with the host via a wireless communications channel, here illustrated by a radio antenna 110 on the display device and an antenna 112 on the host. In the untethered mode, the user carries the display device around with him and the display device gives him access to the full user interface of the host. Of course, the untethered mode is limited by the bandwidth and range of the wireless communications channel. Accompanying the display device may be user input and output peripherals such as a mouse, keyboard, pen 114 for touch input, speaker, camera (402 in FIG. 4), and the like. The host provides processing to run applications, storage, and access to its own peripheral devices. The display device need only provide the amount of processing necessary to communicate with the host, to run the client side of the hosting software, and to provide security functions.

The host computing device 100 provides a docking station 116 that accommodates the display device 108. When in the docking station, the display device switches to tethered mode. In this mode, the display device operates as a display for the host and communicates with the host through connectors 118 on the docking station rather than through the wireless channel. This allows for a higher quality video connection. In FIG. 1, the docking station's connection to the host computer is by way of the wired communications channel 106. Other options are described below. The docking station may provide power to run the display device and to recharge its batteries.

Figure 2:
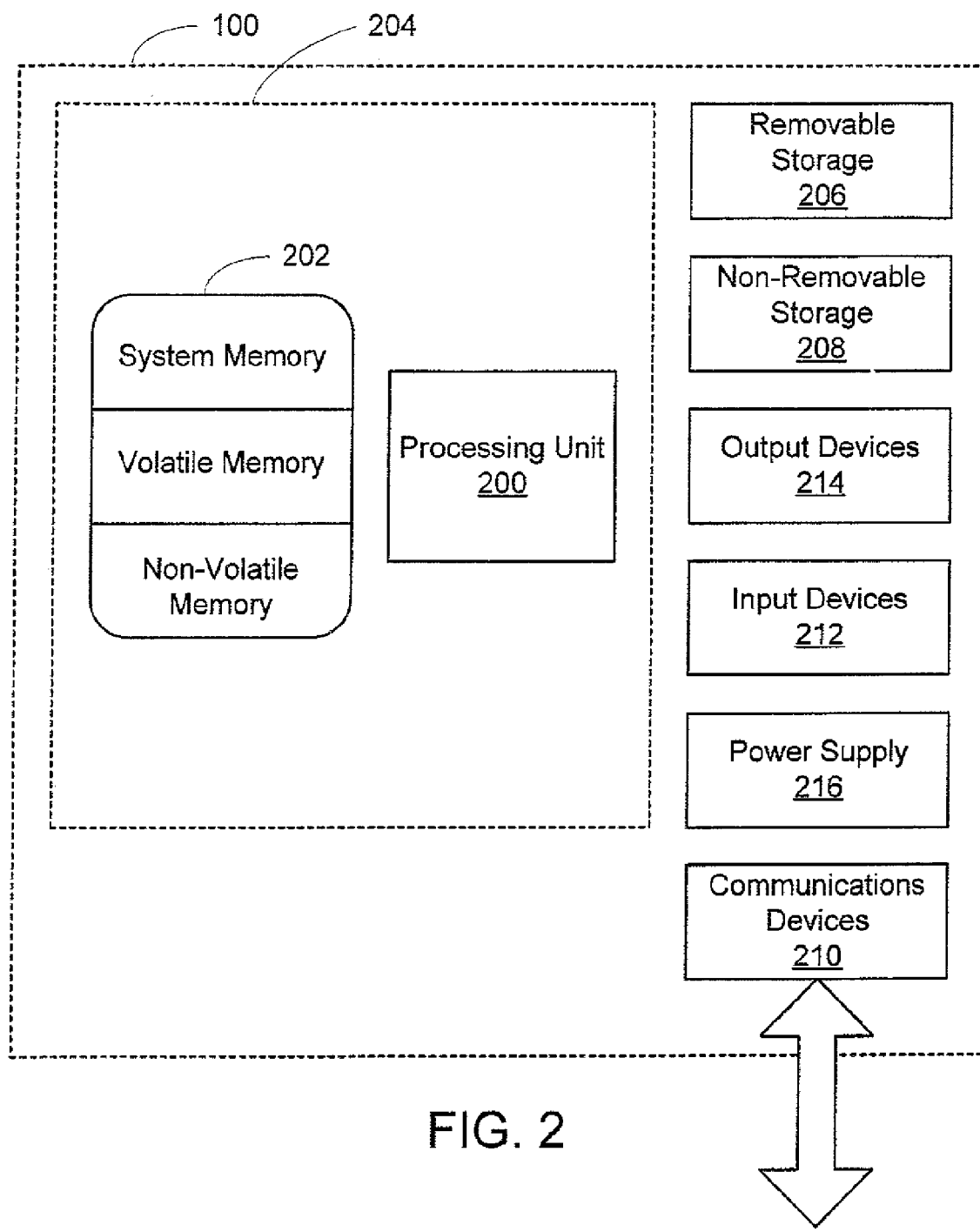
FIG. 2 is a structural diagram of an exemplary architecture usable for the host computing device and for the portable, interactive display device.

The host computing device 100 and portable display device 108 of FIG. 1 may be of any architecture. FIG. 2 is a structural diagram of an exemplary architecture usable for the host computing device and for the portable display device. The architecture portrayed is only one example of a suitable environment and is not intended to suggest any limitation as to the scope of use or functionality of the invention. Neither should the host computing device 100 or display device 108 be interpreted as having any dependency or requirement relating to any one or combination of components illustrated in FIG. 2. The invention is operational with numerous other general-purpose or special-purpose computing environments or configurations. Examples of well-known computing systems, environments, and configurations suitable for use with the invention include, but are not limited to, personal computers, servers, multiprocessor systems, microprocessor based systems, minicomputers, mainframe computers, and distributed computing environments that include any of the above systems or devices. In their most basic configuration, the host and display devices typically include at least one processing unit 200 and memory 202. The memory 202 may be volatile (such as RAM), non-volatile (such as ROM, flash memory, etc.), or some combination of the two. This most basic configuration is illustrated in FIG. 2 by the dashed line 204. The host and display devices may have additional features and functionality. For example, they may include additional storage (removable and non-removable) including, but not limited to, PCMCIA cards, magnetic and optical disks, and magnetic tape. Such additional storage is illustrated in FIG. 2 by removable storage 206 and non-removable storage 208.

Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks (DVD), other optical storage, magnetic cassettes, magnetic tape, magnetic disk storage, other magnetic storage devices, and any other media which can be used to store the desired information and which can accessed by devices 100 and 108. The host device 100 may also contain communications channels 210 that allow the host to communicate with other devices. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks and direct-wired connections (such as the wired communications channel 106 in FIG. 1), and wireless media such as acoustic, radio, infrared, and other wireless media. The term computer-readable media as used herein includes both storage media and communications media. The host 100 and display devices 108 may also have input devices 212 such as a keyboard 102, mouse 104, pen 114, a voice-input device, a touch-input device, etc. Output devices 214 include the devices themselves, such as a screen display, speakers, printer, etc., and rendering modules (often called "adapters") for driving these devices. All these devices are well know in the art and need not be discussed at length here. The devices each have a power supply 216. On the display device 108, the power supply includes a battery and may include circuitry for recharging the battery whenever the display device is in the docking station 116.

Functionality in Untethered Mode: Display Device and Host

Figure 3:
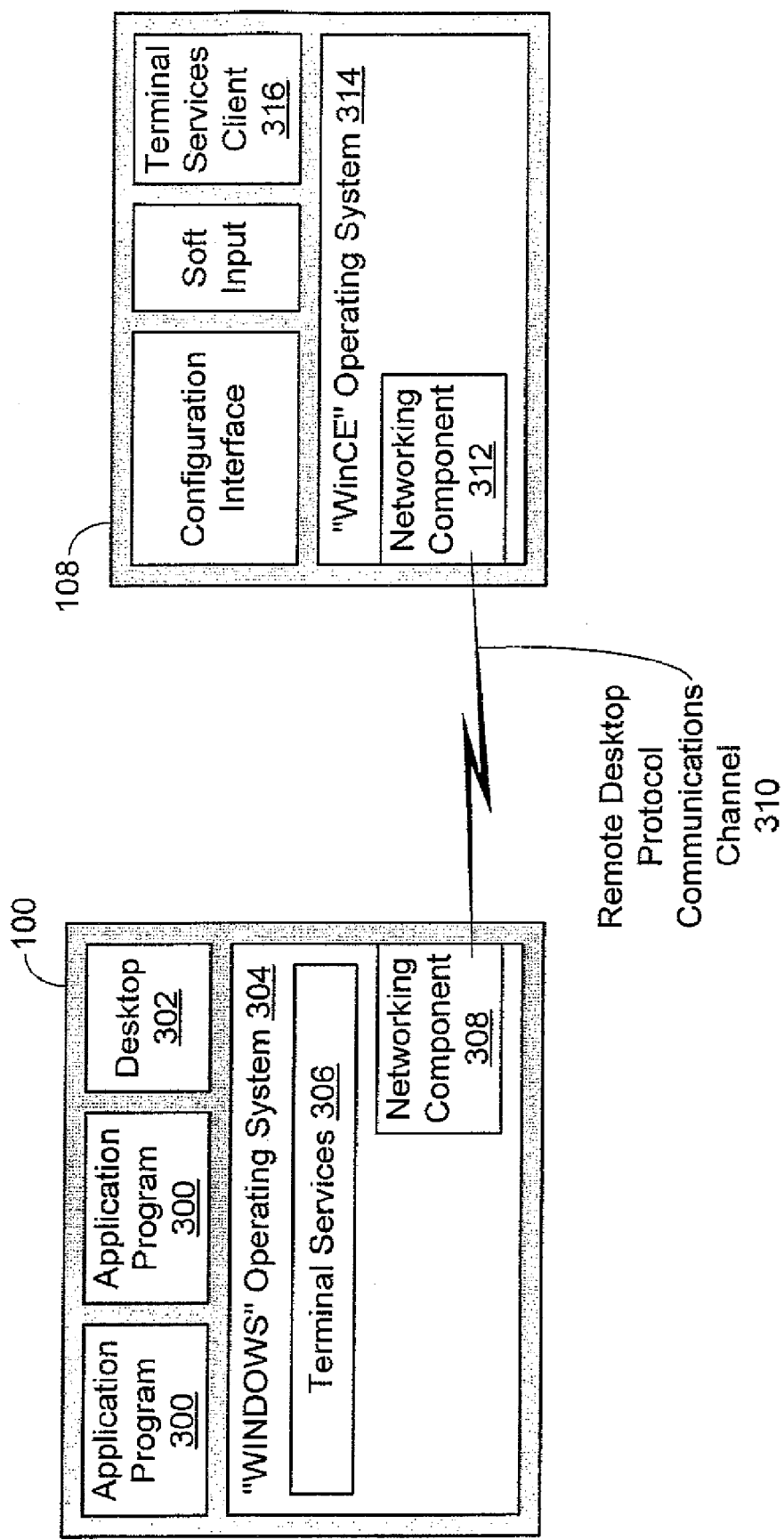
FIG. 3 is a block diagram showing how "WINDOWS TERMINAL SERVICES" software supports the invention.

When operating in untethered mode, the portable, interactive display device is supported by software that projects the user interface of the host computing device to the display device. The software also accepts user input from the display device and sends I to the host. As an example of this software, FIG. 3 is a block diagram of Microsoft's "WINDOWS TERMINAL SERVICES" (WTS). An application program 300 running on the host 100 sends its output to the operating system 304 intending the output to be displayed in one or more windows managed by the Desktop 302. If the user of the application program is using a portable display device 108, however, the Terminal Services software component 306 intercepts the display output, reformats it, and delivers it to the Networking software component 308 for transport to the display device.

Figure 4:
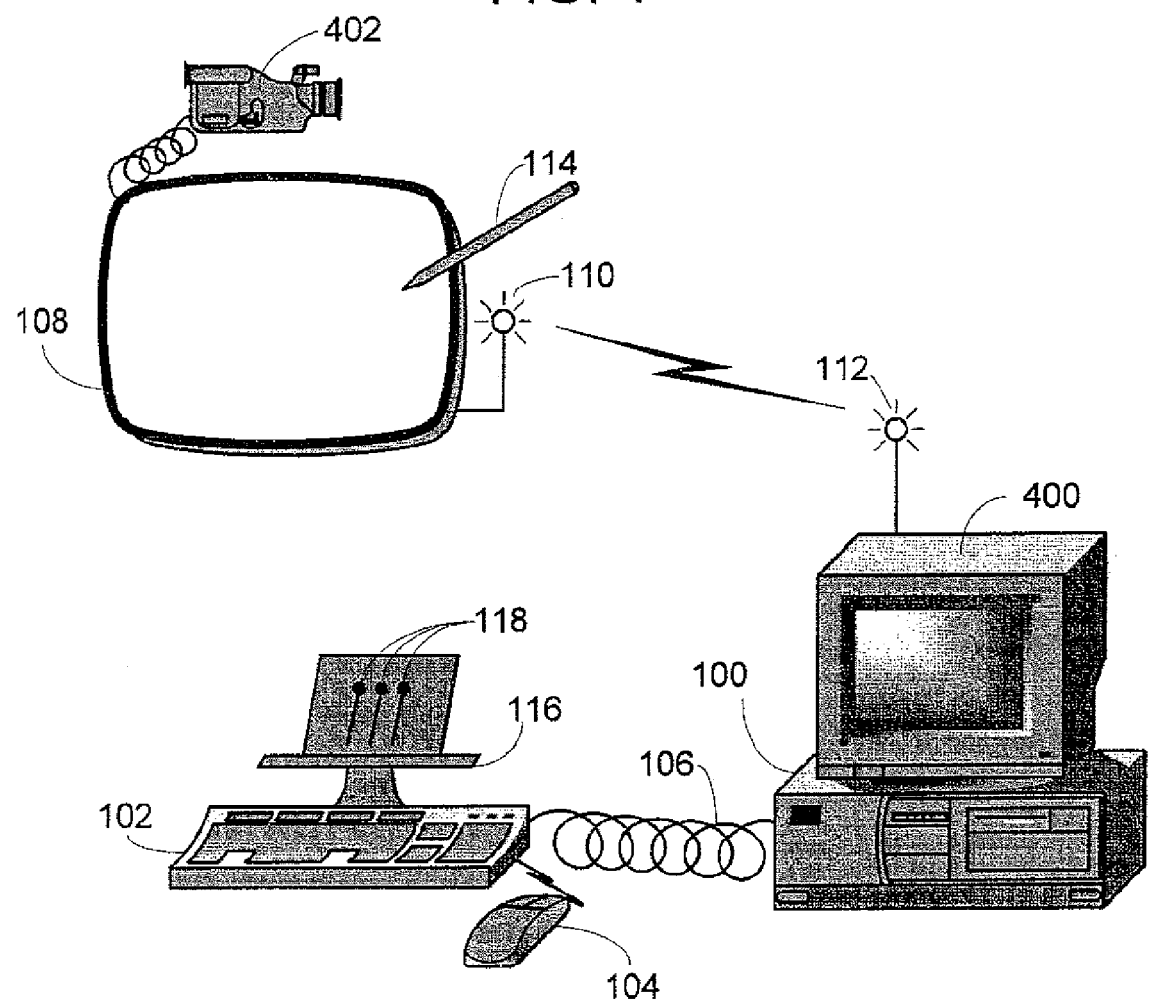
FIG. 4 is a schematic drawing showing possible configuration variations when the portable, interactive display device operates in the untethered mode.

The display information is transported to the portable display device 108 by a standard protocol such as Microsoft's Remote Desktop Protocol 310 or the Independent Computing Architecture protocol. These protocols allocate the limited bandwidth of the wireless communications channel, an especially important consideration when a bandwidth-intensive peripheral, such as the camera 402 in FIG. 4, is attached to the portable display device.

When the display information reaches the Networking component 312 on the portable display device 108, it is passed to the Terminal Services Client component 316. That component interprets the information and displays it on the display device's screen. If the display device is associated with a user input device, such as the pen 114 or the camera 402, then this procedure is reversed and the input from the device is presented to the Application Program 300 as if it were generated locally on the host 100.

The support software handles issues such as user authentication, encryption of data carried on the wireless communications channel, and application program licensing. For a discussion of licensing issues, see U.S. Pat. No. 6,189,146, "System and Method for Software Licensing," incorporated herein by reference. Software on the display device 108 stores configuration parameters and login credentials of its users. If wireless communications are interrupted during a user session, the display device uses the cached user credentials to automatically relogin when the host again comes within range.

Note that FIG. 3 is for illustrative purposes only, and the invention is not limited to the specific software components and protocols shown. In particular, one advantage of the invention is that the display device may run an operating system entirely different from that of the host. The standard display protocol hides implementation differences. The protocols and transport methods used to carry the display information are chosen to suit particular needs. For example, protocols TCP/IP, SPX, IPX, and NetBEUI may each be appropriate in certain situations. Appropriate transport methods include infrared and short-range radio such as Bluetooth, IEEE's 802.11b, and IEEE 1394 Firewire.

The host computing device 100 may run WTS in either single-user or multi-user mode. For a discussion of the issues involved in the multi-user mode, see U.S. Pat. No. 6,085,247, "Server Operating System for Supporting Multiple Client-Server Sessions and Dynamic Reconnection of Users to Previous Sessions Using Different Computers," incorporated herein by reference. When in single-user mode, the host supports only one user session. If a user is using an untethered display device 108, then the host sends no display output to its locally attached display 400 (if any), thus darkening its screen. The host also ignores input from local peripherals such as the keyboard 102 and mouse 104. On the other hand, a host running in multi-user mode supports multiple, live, and concurrent user sessions. The user of an untethered display device is just one of potentially several users. Each display device, untethered, tethered, or locally attached as 400, operates independently to present its user with the full capabilities of a host session.

Functionality in Tethered Mode: The Docking Station

Figure 5:
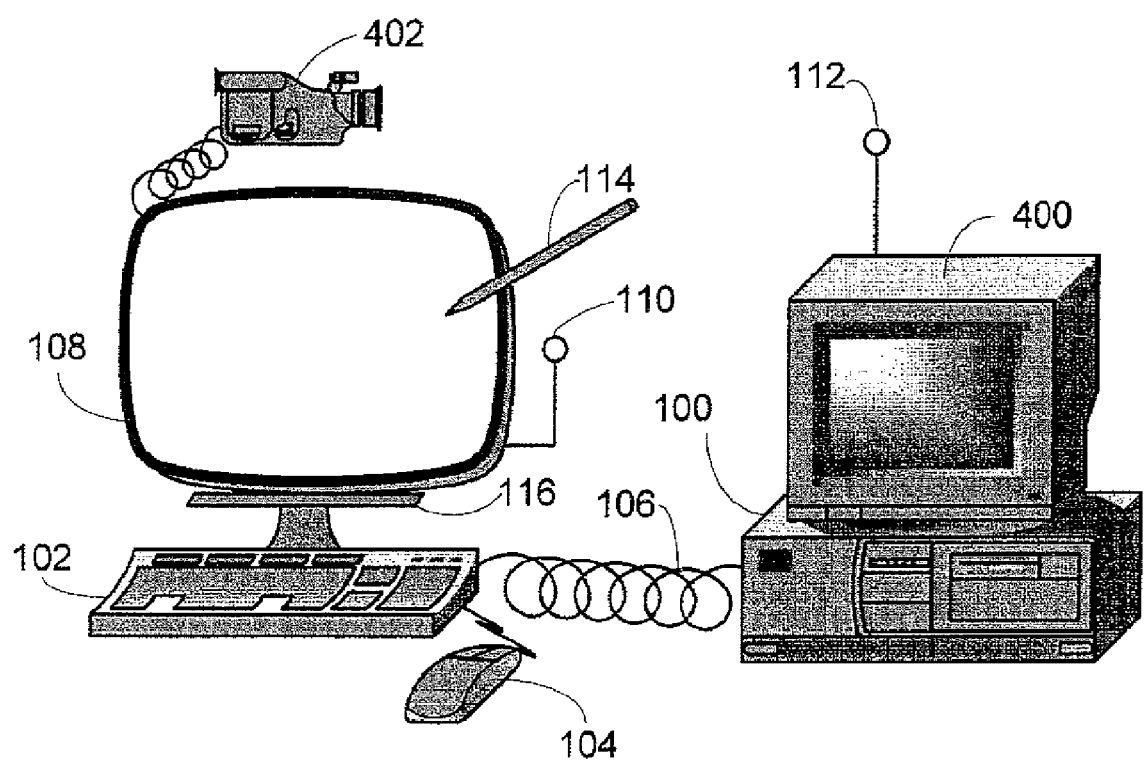
FIG. 5 is a schematic drawing showing a portable, interactive display device 20 sitting in a docking station and operating in tethered mode.

FIG. 5 shows the portable, interactive display device 108 sitting in its docking station 116 and operating in the tethered mode. The wireless connection illustrated in FIG. 1 is silent in this mode. Communications from the host computing device 100 are carried over the wired channel 106 to the docking station and then through the connectors 118 (shown in FIG. 1) to the display device. In some embodiments, these connectors carry display signals (such as VGA signals) directly to the display device without mediation of an intervening data protocol. This direct connection provides a higher quality video signal than is available over most wireless channels. When tethered, the display device receives electrical power through the connections to its docking station. Depending upon the configuration of the hosting software, a tethered display device may serve a user other than the one using the locally connected display 400 or one user may use both displays in a multiple-monitor mode.

Figure 6A:
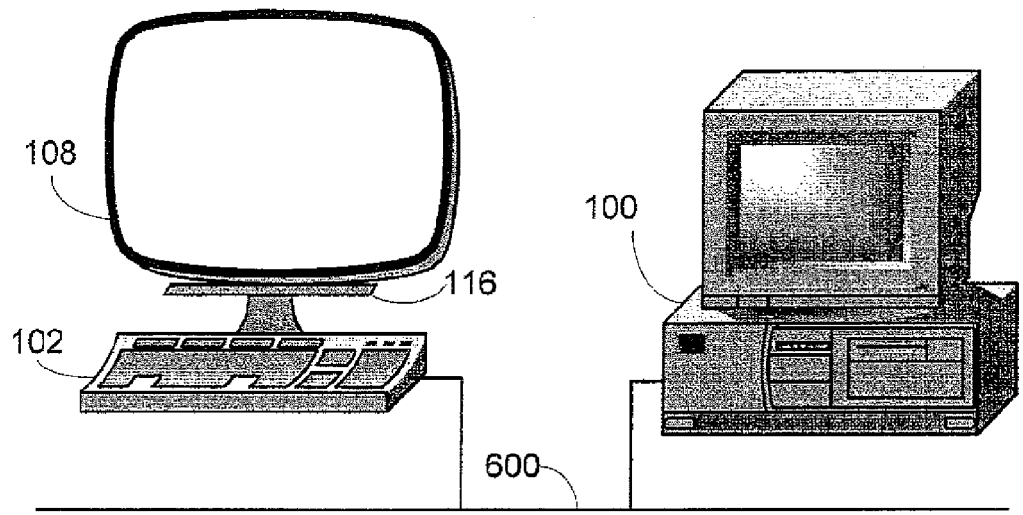
FIGS. 6A and 6B are schematic drawings showing possible embodiments of a docking station connected to the host computing device by a Local Area Network.
Figure 6B:
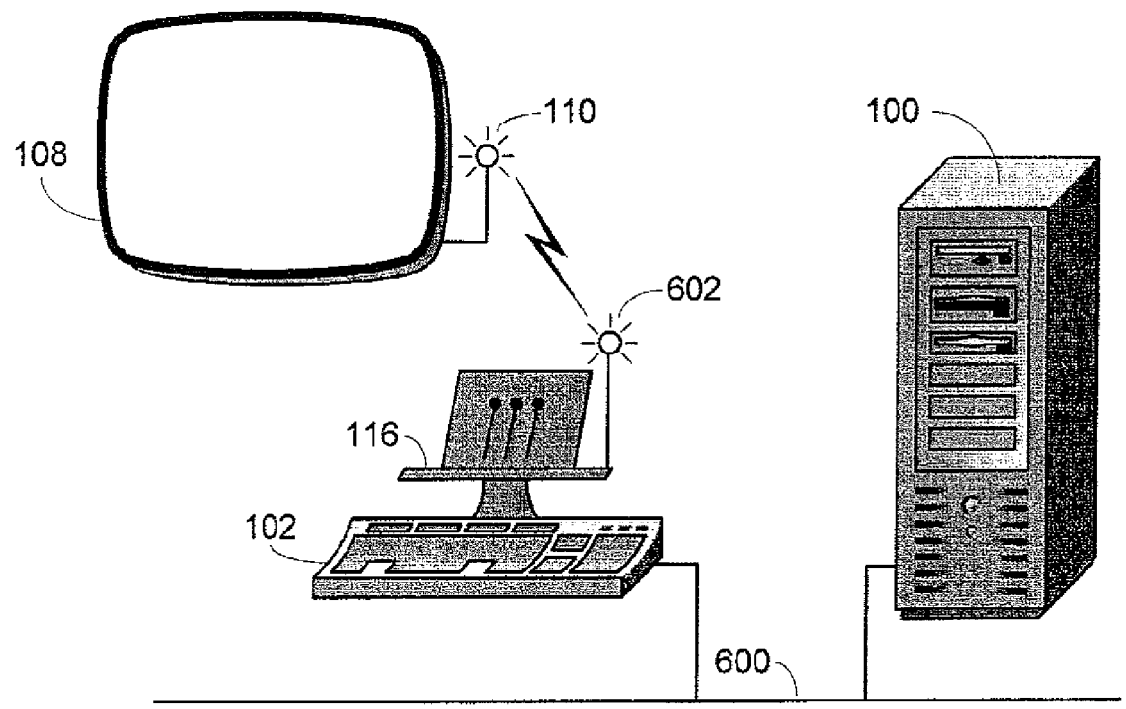

Wiring the docking station 116 directly to the host computing device 100 limits the possible distance between the host and the docking station. For those applications in which it is desirable to place the docking station at some remove from the host, the direct wired communications channel 106 is replaced with a remote connection, such as the LAN 600 illustrated in FIGS. 6A and 6B. In these embodiments, the docking station receives power from a wall outlet. The LAN carries information between the host and peripherals either directly connected to the docking station, such as the keyboard 102, or connected to the display device, such as the camera 402. Replacing the LAN with a WAN (e.g., Internet) connection allows the docking station to be even farther removed from the host, potentially on a different continent. When the docking station is remotely connected to the host, the display device shown in FIG. 6B communicates wirelessly with the docking station via antenna 602 rather than directly with the host. In this case, when the display device operates in the untethered mode, its connection with the host flows over both a wireless channel to the docking station and over the docking station's connection to the host.

Altering the User Interface Between Tethered-Optimal and Untethered-Optimal Mode A user may be happy with a pen 114 whenever the portable, interactive display device 108 is untethered but may prefer the keyboard 102 and mouse 104 when they become available, that is, when the display device is in the docking station 116. The same user may be happy with a ten-point default font size when the display device is docked but may prefer a larger size when the device is untethered and subject to movement. There is no one set of interface parameters optimal for use in both the tethered and untethered environments. Because the display device moves between these two environments, it changes its interface parameters to suit its operating environment and to suit the particular peripherals in use. As an example of changing the parameters to suit the peripherals, consider that a pen is generally not as accurate a pointing device as a mouse. A movement of a couple of pixels may be unintentional. Thus, two clicks in rapid succession, the second a couple of pixels away from the first, is interpreted as a double click for a pen but not for a mouse. Also, a pen and the hand holding it obscure part of the display screen. Because of this, pop-up menus should appear above the selection and away from the user's pen-wielding hand. By managing these parameter changes itself, the display device shields their details from the host computing device. Changes in interface parameters are also shielded from the application programs by having the operating system manage the changes.

In view of the many possible embodiments to which the principles of this invention may be applied, it should be recognized that the embodiments described herein with respect to the drawing figures are meant to be illustrative only and should not be taken as limiting the scope of invention. Therefore, the invention as described herein contemplates all such embodiments as may come within the scope of the following claims and equivalents thereof.

What is claimed is:

1. A portable display system for use with a computing device, the portable display system usable when it is in contact with a docking station of the computing device and usable when it is not in contact with the docking station, the portable display system comprising:
    a display screen;
    a wireless communications receiver;
    a tethered communications receiver;
    a display rendering module; and
    a logic device for determining whether the portable display system is in contact with the docking station, for connecting output from the tethered communications receiver to the display rendering module if the portable display system is in contact with the docking station, and for connecting output from the wireless communications receiver to the display rendering module if the portable display system is not in contact with the docking station, wherein:
    the wireless communications receiver receives display signals from the computing device, and
    the tethered communications receiver receives display signals from the computing device, the display signals received by the tethered communications receiver being of a higher quality than the display signals received by the wireless communications receiver.

2. The portable display system of claim 1 wherein the wireless communications receiver is of a type in the set: radio receiver, infrared receiver.

3. The portable display system of claim 1 further comprising:
    a signal strength evaluator that evaluates a strength of a communications signal received by the wireless communications receiver.

4. The portable display system of claim 3 further comprising:
    a user warning signal triggered when the strength of the communications signal received drops below a predetermined level.

5. The portable display system of claim 3 further comprising:
    a second signal strength evaluator that evaluates a strength of a communications signal received by the tethered communications receiver and wherein the logic device detects that the portable display system is in contact with the docking station by comparing the strengths of the received communications signals.

6. The portable display system of claim 1 further comprising:
    a physical proximity detector and wherein the logic device detects that the portable display system is in contact with the docking station by referring to the physical proximity detector.

7. The portable display system of claim 1 further comprising:
    a power connector that connects to the docking station of the computing device.

8. The portable display system of claim 1 further comprising:
    a user input device; and
    a wireless communications transmitter
    wherein input from the user input device is transmitted to the computing device.

9. The portable display system of claim 8 wherein the user input device is in the set: mouse, keyboard, trackball, pen, touch screen, microphone, camera.

10. The portable display system of claim 8 wherein the user input device is physically connected to the remainder of the portable display system.

11. The portable display system of claim 8 wherein the user input device is wirelessly connected to the remainder of the portable display system.

12. The portable display system of claim 1 further comprising a user output device in the set: speaker, display light.

13. The portable display system of claim 1, wherein the computing device operates on a first operating system, and the portable display system operates on a second operating system different from the first operating system.

14. A docking station for use with a portable display system and with a computing device, the docking station comprising:
    a first communications channel to the computing device, first display signals being received at the first communications channel; and
    a second communications channel to the portable display system, second display signals being received at the second communications channel, wherein the first display signals have higher signal quality than the second display signals.

15. The docking station of claim 14 wherein the first communications channel comprises a connection of a type in the set: wired, fiber optic, radio, infrared, LAN, WAN access.

16. The docking station of claim 14 further comprising:
    a user input device.

17. The docking station of claim 16 further comprising:
    a logic device for detecting whether the portable display system is in contact with the docking station, and for connecting input from the user input device to the first communications connection if the portable display system is in contact with the docking station.

18. The docking station of claim 14 wherein the second communications channel is a tethered communications channel and further comprising:
    a third, wireless communications channel to the portable display system; and
    a logic device for detecting whether the portable display system is in contact with the docking station, and for connecting input from the first communications channel to the second communications channel if the portable display system is in contact with the docking station, and for connecting input from the first communications channel to the third communications channel if the portable display system is not in contact with the docking station.

19. A method for a portable display device with at least two communications receivers to communicate with a computing device, the method comprising:

setting a first communications receiver to be a default communications receiver, wherein the first communications receiver receives first display signals from the computing device;

evaluating a strength of a communications signal received by the default communications receiver; and if the evaluated strength of the received communications signal is above a predetermined level, then displaying the communications received by the default communications receiver, else displaying the communications received by a second communications receiver, wherein the second communications receiver receives second display signals from the computing device, and the first display signals have higher signal quality than the second display signals.

20. A computer-readable medium having instructions for performing the method of claim 19.

* * * * *